United States Patent [19]

Cocke et al.

[11] Patent Number: 4,802,091
[45] Date of Patent: Jan. 31, 1989

[54] METHOD FOR IMPROVING THE EFFICIENCY OF ARITHMETIC CODE GENERATION IN AN OPTIMIZING COMPILER USING THE TECHNIQUE OF REASSOCIATION

[75] Inventors: John Cocke; Peter W. Markstein, both of Austin, Tex.

[73] Assignee: International Business Machines Corporation, Armonk, N.Y.

[21] Appl. No.: 926,316

[22] Filed: Oct. 31, 1986

[51] Int. Cl.⁴ .............................................. G06F 9/44
[52] U.S. Cl. .................................... 364/300; 364/200
[58] Field of Search .............................. 364/300, 200

[56] References Cited

U.S. PATENT DOCUMENTS

| 4,215,416 | 7/1980 | Muramatsu | 364/736 |
| 4,309,756 | 1/1982 | Beckler | 364/300 |
| 4,367,535 | 1/1983 | Matsugama | 364/736 |
| 4,399,517 | 8/1983 | Niehaus et al. | 364/784 |

FOREIGN PATENT DOCUMENTS 1413938 11/1975 United Kingdom .

OTHER PUBLICATIONS

Randolph G. Scarborough and Harwood G. Kolsky, "Improved Optimization of Fortran Object Programs," IBM J. Res. Develop. vol. 24, No. 6, pp. 660–676, Nov. 1980.

Robert Paige, "Formal Differentiation," Courant Computer Science Report #15, Courant Institute of Mathematical Sciences, New York University, Sep. 1979.

Primary Examiner—Gareth D. Shaw
Assistant Examiner—Paul Kulik
Attorney, Agent, or Firm—Roy R. Schlemmer, Jr.

[57] ABSTRACT

A procedure for use in an optimizing compiler termed "reassociation" determines the preferred order of combining terms in a sum so as to produce loop invariant subcomputations, or to promote common subexpressions among several essential computations, by applying the associative law of addition. To achieve this, the requisite optimization of an object program or program segment, the following discrete steps must be performed after the strongly connected regions, USE and DEF chains have all been identified:

1. Find the region constants and induction variables;
2. Identify all of the essential computations;
3. Write every essential computation as a sum of products;
4. Exploit the use and DEF functions to substitute the definition of each operand R in an essential computation, if there is a unique computation of R in the strongly connected region and the defining operation is +, −, ×, or copy;
5. Fix displacements;
6. Determine how to compute each essential computation and rewrite code to use this preferred method of computation;
7. Insert code to update the new induction variables;
8. Perform linear test replacement.

5 Claims, 7 Drawing Sheets

DETAIL OF PART OF CODE
OPTIMIZATION PHASE OF AN OPTIMIZING
COMPILER, SHOWING REASSOCIATION
AND RELATED OPTIMIZATIONS

OVERALL ORGANIZATION
OF AN OPTIMIZING COMPILER

DETAIL OF PART OF CODE
OPTIMIZATION PHASE OF AN OPTIMIZING
COMPILER, SHOWING REASSOCIATION
AND RELATED OPTIMIZATIONS

REASSOCIATION APPLIED TO
ONE STRONGLY CONNECTED REGION

FIX DISPLACEMENTS (CONSTANT TERMS) TO COMPLY WITH ADDRESSING MODE CONSTRAINTS

REASSOCIATION STEP

STRENGTH REDUCTION STEP

LINEAR TEST REPLACEMENT AND
DEAD INDUCTION VARIABLE ELIMIMATION

METHOD FOR IMPROVING THE EFFICIENCY OF ARITHMETIC CODE GENERATION IN AN OPTIMIZING COMPILER USING THE TECHNIQUE OF REASSOCIATION

FIELD OF THE INVENTION

The present invention has particular utility in a compiler in which optimization algorithms are used to improve the quality of the generated code. It is particularly useful in improving the code required to address objects in storage. Languages such as FORTRAN, PASCAL, C, PL/1, ADA, etc. that deal with arrays of objects can be translated to excellent object code using this invention.

While this invention will find utility in optimizing compilers for all types of computers, it has particular significance for reduced instruction set computers (RISC) which lack a multiplication instruction, or for micro-computers which either lack a multiply instruction or have a very slow multiply instruction, because in many instances, this invention will replace multiplications which occur in address computations by additions.

Background of the Invention

The quality of code produced by compilers has been an issue ever since the first compiler was produced. One of the principal objectives of IBM's FORTRAN I compiler, the first commercially available compiler, was to produce object code in the field of scientific computation which was comparable in code quality to that produced by assembly language programmers.

Today, higher level languages are designed to be used in every field in which computers are applicable. Even the original FORTRAN language has been bolstered to make it applicable to a wide range of programming tasks. However, it is still important that the quality of code produced by the compiler be high, especially if the resultant code is to be used in a production environment. Code produced by a skilled assembly language programmer is still the yardstick against which compiler produced code is measured.

A large number of optimization techniques have been developed and refined since the 1950's to improve the quality of compiler generated code. Indeed, many of these optimizations were known in principle, and used in some fashion by the team that produced the first FORTRAN compiler.

Optimizations that are frequently employed in optimizing compilers include common subexpression elimination, moving code from regions of high execution frequency to regions of low execution frequency (code motion), dead code elimination, reduction in strength (replacing a slow operation by an equivalent fast operation), constant propagation, and code selection. Descriptions of these optimizations can be found in:

J. T. Schwartz, On Programming-An Interim Report on the SETL Language. Installment II: The SETL Language and Examples of Its Use, Courant Institute of Math Sciences, NYU, 1983, pp. 293-310.

E. Morel and C. Renvoise, Global Optimization by Suppression of Partial Redundancies, CACM, Vol. 22, No. 2, pp. 96-103, 1979.

A. Aho and J. Ullman, Principles of Compiler Design, Addison-Wesley, 1977.

The technique referred to as 'Reassociation,' in the present application, combines many transformations to make the computations of certain sums, or sum of products more efficient. Many of these computations arise in addressing quantities in storage, and any optimizations to improve such code must, among other considerations, account for the addressing modes of the object machine.

Some of the effects that are described herein have been achieved by other means in even the earliest compilers. In particular, IBM's FORTRAN I compiler had a very effective strength reduction algorithm to remove multiplications from addressing computations in loops. It has become traditional in FORTRAN compilers to include effective strength reduction.

But there are other improvements which do not naturally fall out of strength reduction routines. These involve reordering the computation of sums in order to increase the number of common sub expressions, and tailoring computations to match the addressing architecture of the object computer. These matters are also addressed by reassociation.

Reassociation considers these issues in a manner in which the machine dependent aspects can easily be parameterized. Reassociation also allows the issues of rearranging and simplifying computations to be addressed from an abstract viewpoint which will remain valid when a compiler is modified to translate another language or produce code for another target machine.

As disclosed in the Prior Art section, while some concepts used in the technique known as 'Reassociation' have been known and discussed in the literature, no specific combination of these concepts applied to an optimizing compiler in the manner set forth and described in this present application, is known to exist. It is believed that the overall 'reassociation' procedure disclosed and described herein as utilized in an optimizing compiler will produce significantly improved code when applied to a specific target architecture.

PRIOR ART

The following references set forth general background information about the overall reassociation concept:

1. Randolph G. Scarborough and Harwood G. Kolsky, "Improved Optimization of FORTRAN Object Programs," IBM J. Res. Develop., Vol. 24, No. 6, pp. 606-676, November 1980.
2. Robert Paige, "Formal Differentiation," Courant Computer Science Report #15, Courant Institute of Mathematical Sciences, New York University, September 1979.

The Scarborough and Kolsky paper describe a number of code transformations which are performed in IBM's FORTRAN compiler, but that paper does not describe the means by which the transformation are carried out. The code improvements described by Scarborough and Kolsky are all obtainable by this invention, as are other code improvements which they did not describe.

Paige's thesis describes the formal method of computing complex functions by a formal differencing technique. Methods such as Paige's may be applied in the overall compiler to strength reduce some of the expressions which reassociation produces.

U.S. Pat. Nos. 4,215,416 of Muramatsu, 4,367,535 of Matsuyama and 4,399,517 of Niehaus et al disclose hardware adders which employ 'associative' rules of additions and constitute the 'closest' art found during a novelty search for the present invention in the search files of the U.S. Patent Office.

The concept of 'associative' addition disclosed therein has little relevance to the removal of additions from loops and the removal of unnecessary multiplications from an object program being compiled as is taught by the present invention.

The two following patents were found during a general search for art relevant to procedures used to enhance optimizing compilers.

U.S. Pat. No. 4,309,756 discloses a method for evaluating certain logical computations. The disclosed concepts are narrow in scope and anachronistic for a patent issued in 1982. It is primarily background art in that it sheds no light on naming computations so that potentially redundant computations are given the same name.

UK Pat. No. 1,413,938 is concerned with techniques for testing compiler output for correctness. it could be used to test the correctness code generated by an optimizing compiler. However, it bears no relevance as to how the optimizing compiler generates code in general, or how it achieves its optimizations.

RELATED APPLICATIONS

The following copending applications all relate to procedures for use in an optimizing compiler which will produce enhanced code for the target system architecture. They are cumulative to the present invention in the sense that they improve compiler optimization but are not in any way necessary to the application of the present invention. The first three applications would all have primary use during the 'code optimization' phase of compiler operation (block 3 of FIG. 1) as is the case with the present invention.

Copending application Ser. No. 640,285 filed Aug. 13, 1984, now U.S. Pat. No. 4,642,764, of M. E. Hopkins et al, entitled "A Method of Developing Formal Identities and Program Bases in an Optimizing compiler." This invention teaches that under certain code generation strategies, a 'basis' can be selected during the intermediate code generation process. It is not necessary to wait for code generation to be completed to determine a 'basis.' In such cases, all computations can be expressed in terms of the 'basis' immediately during intermediate code generation.

Copending application Ser. No. 640,283 filed Aug. 13, 1984, now U.S. Pat. No. 4,656,583, of J. Cocke et al, entitled "A Method for Improving Global common Subexpression Elimination and Code Motion in an Optimizing Compiler." This invention relates to a procedure or method for use during the optimization phase of an optimizing compiler for performing global common subexpression elimination and code motion. The procedure includes determining the code 'basis' for the object program which includes examining each basic block of code and determining the 'basis' items on which each computation depends wherein 'basis' items are defined as operands which are referenced in a basic block before being computed. It next determines the "kill set" for each 'basis' item. Following this UEX, DEX, and THRU are determined for each basic block using the previously determined 'basis' and "kill set" information. AVAIL and INSERT are computed from UEX, DEX, and THRU, and appropriate code insertions are made at those locations indicated by the preceding step, and finally redundant code is removed using the AVAIL set.

Copending application Ser. No. 723,395 filed Apr. 15, 1985, now U.S. Pat. No. 4,642,765, of J. Cocke et al, entitled "Optimization of Range Checking." This invention relates to a procedure used in an optimizing compiler and more specifically to a feature known as 'optimization of range checking' which eliminates range checking code from inner loops of some programs where possible. The disclosed and claimed algorithm may be synopsized as follows:

When additional loop exist after the one based on the induction variable, the tests from the subsequent blocks must be performed on an alternative path. The reason is that in the unmodified program the subsequent test may have caused a loop exit along a different exit path, it is only necessary to test that the induction variable attained its intended maximum (or minimum, if the induction variable is decreasing) when the copy of the tests in subsequent blocks would not have caused a jump to the loop exit.

The procedure described in the following copending application would have primary application either before or after the 'register allocation' phase of the compiler operation (block 4 of FIG. 1). Again, the invention is also cumulative to that described herein.

Copending application Ser. No. 666,001 filed Oct. 31, 1984, now abandoned, of M. E. Hopkins et al, entitled "A Method for Generating Short Form Instructions in an Optimizing Compiler." This invention relates to a method for improving the quality of code generated by an optimizing compiler or assembler, for a target machine that has short and long forms of some of its instructions with the short forms executing faster or occupying less space. The method first determines which bits of the result of each computational instruction are significant, by a backwards pass over the program that is similar to liveliness analysis. Then the significant bits thus computed are used to guide the code selection process to select the most efficient instruction that computes the correct result in all the significant bit positions.

OBJECTS OF THE INVENTION

It is a primary object of the present invention to provide a code optimization procedure for use in an optimizing compiler which utilizes the principles of reassociation to obtain more efficient object code.

It is yet another object of the invention to provide such an optimizing procedure which replaces multiplications with additions in loops (or strongly connected regions) where ever the opportunity is found to exist.

It is a further object of the invention to provide such an optimizing procedure which can be readily tailored to the specific addressing modes available in a target computer's architecture.

It is another object of the invention to provide such an optimizing procedure wherein the procedure is applied individually to all strongly connected regions in the program.

These and other objects, features and advantages of the present invention will be apparent from the subsequent description in conjunction with the FIGURES and claims.

SUMMARY OF THE INVENTION

The objects of the present invention are accomplished in general by an optimization procedure for use in the 'code optimization' phase of an overall optimizing compiler's operation which utilizes the principles of reassociation to determine the preferred order of combining terms in a sum so as to produce loop invariant subcomputations or to promote common subexpressions among several essential computations which need be computed only once. To achieve the requisite optimization of an object program or program sequence, the following steps must be performed:
1. Determine strongly connected regions.
2. Determine USE and DEF functions.
3. Identify all essential computations (E.C.s).
4. Rewrite ECs in normal form as a sum of products,
5. Examine the collection of ECs in normal form to determine the order in which the additions contained therein should be made, and identifying the addends associated therewith,
6. Rewrite ECs where possible in terms of the addends found in step 5.
7. Rewrite loop exit conditions in terms of addends found in step 5.
8. Repeat steps 2 thru 7 for each loop in the program beginning with innermost loop.
9. Eliminate the dead code and 10. Perform global constant propagation.

DISCLOSURE OF THE INVENTION

Figure 1:
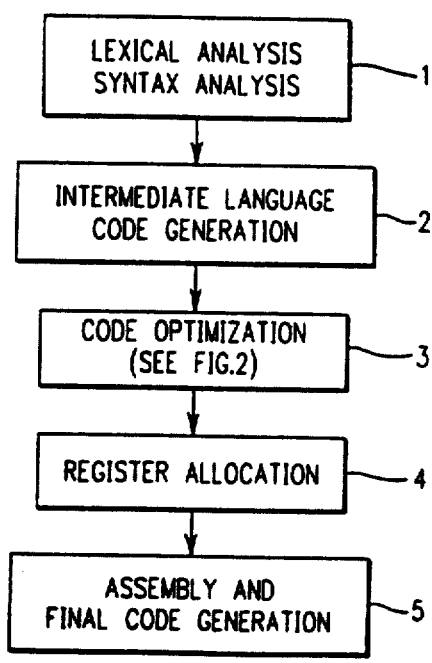
FIG. 1 comprises a high level flowchart illustrating the overall organization of an optimizing compiler.

To facilitate the description of the present invention, the following terms which are used throughout the specification and claims will first be defined in detail for convenience of reference. Many of the terms are well understood in the field of optimizing compilers while others have specific application to the herein disclosed invention.

DEFINITION OF TERMS

An Essential Computation produces a result which is required for one of the following reasons:
1. It is used to access memory (i.e., it is an address),
2. It is stored in memory,
3. It is an argument to a subprogram, or
4. It is output to an external medium.
For example, in the statement:
  display (A+B+C);
  the result of adding A, B, and C is essential because it is output. It is probably implemented as (A+B)+C, or A+(B+C), since adders on most machines are two-input.

However, neither A+B nor B+C are essential even though one of them may be computed enroute to the essential result (A+B+C).

In fact, reassociation determines, for the above example, which of the computations,
  (A+B)+C,
  A+(B+C), or
  (A+C)+B
is most advantageous in the context in which it occurs. In the code fragment below:
  Do B=1 to 10
  display (A+B+C);
  end;
the preferred method of computation is (A+C)+B, since A and C can be added outside the loop, and only one addition is required in the loop.

While the above examples have involved computations which are essential because they are output values; in practice, the most frequently occurring instances of essential computations are addressing computations.

STRONGLY CONNECTED REGION:
  A subgraph in which there exists a path between any nodes in the subgraph which does not include nodes outside the subgraph.

SINGLE ENTRY STRONGLY CONNECTED REGION:
  A strongly connected region in which there is only one node which has predecessors outside the strongly connected region. A single entry strongly connected region corresponds to the common programming notion of a loop. In the following description, the acronym SCR will be used to mean a single entry strongly connected region.

USE FUNCTION:
  The USE Function for a program point P identifies all program points where the object computed at P is used as an operand.

DEF FUNCTION:
  The DEF Function for a program point P and an Operand O which is used at P is the set of all program points at which O is computed and from which program point P can be reached without passing through another computation of O.

REGION CONSTANT:
  A region constant, rc, with respect to an SCR, is an object that is not computed in the SCR; that is, the DEF function for rc includes no program points (instructions) in the SCR.

INDUCTION VARIABLE:
  An induction variable v for an SCR, is a variable whose only definitions within the SCR are given by linear relationships such as $v = w + rc$ $v = w$ where rc is a region constant, and w is an induction variable, w may be the same as v (which is the most common case).

ENTRY NODE:
  The entry node of an SCR is the unique node within the SCR which has predecessors not contained in the SCR.

HEADER NODE:

The header node of an SCR is the unique predecessor of the entry node which is not contained in the SCR. If an SCR does not contain a header node, the control flow graph can easily be modified to an equivalent control flow graph with a header node, will be apparent to those skilled in the art.

ARTICULATION NODE:

An articulation node of a subgraph is a node which must be visited on every traversal of the subgraph.

DISCLOSURE OF THE INVENTION

The figures which comprise the flow charts of the present invention are largely self explanatory. FIG. 1 is a very high level flow chart for a compiler as is well knows in the art. Blocks 1, 2, 4 and 5 are quite straightforward and well known. The figure clearly shows where Block 3 entitled "Code Optimization", which comprises that phase of the compiler activity to which the present invention applies, occurs in relation to syntax analysis and final code generation.

In the following description of the overall "Code Optimization" procedure, the relationship between the steps described to the various blocks of the figures is set forth parenthetically.

Figure 2:
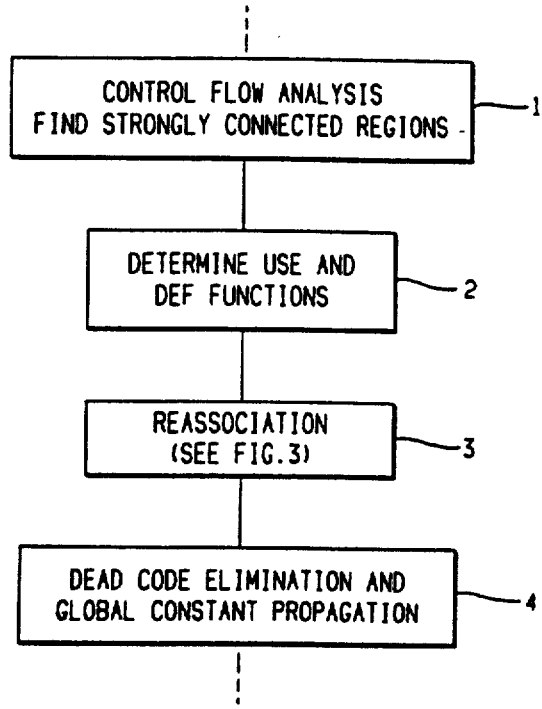
FIG. 2 comprises a flow chart of that portion of the "Code Optimization" phase which includes the instant invention.

Reassociation determines the preferred order of combining terms in a sum as to produce loop invariant subcomputations, or to promote common subexpressions among several essential computations, by applying the associative law of addition. At the same time, the invention as disclosed here simplifies some of the newly formed computations by strength reduction, and takes into account the addressing modes of the target computer. In order to achieve this, the following steps must be taken:

The following steps 1 and 2 are accomplished by the blocks shown in FIG. 2 which shows that portion of the "Code Optimization" phase which includes the instant invention. From the figures it may be seen that the optimization transformations which precede and follow the steps detailed in this figure are not material to the invention. But control flow analysis, determination of strongly connected regions, and the computation of USE and DEF functions must precede Reassociation, and dead code elimination and (global) constant propagation must follow it.

1. Determine the flowgraph of the program. Then identify the single entry strongly connected regions, making a list of these regions so that any region which contains imbedded strongly connected regions follows all the imbedded regions in that list. Such a listing is alway possible: see, for example the above cited reference by Hecht (FIG. 2 Block 1).
2. Determine the Use and Def functions (FIG. 2, block 2).

Figure 3:
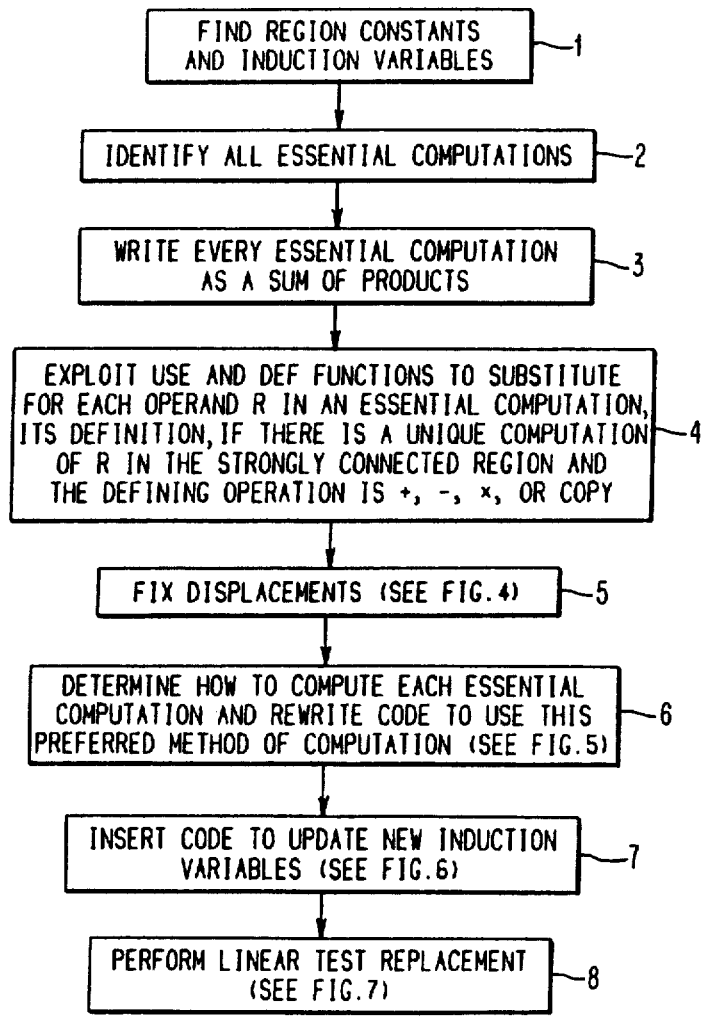
FIG. 3 comprises a flow chart illustrating the various steps of "Reassociation" which must be applied to a strongly connected region (i.e., a loop).

Steps 3 through 7 are accomplished by the detailed sequence shown in FIG. 3. The various steps of Reassociation which must be applied to a strongly connected region (i.e., a loop) are clearly defined with reference to FIGS. 4, 5, 6, and 7.

3. The single entry strongly connected regions are now processed in order, performing all of the remaining steps for each of the single entry strongly connected regions (blocks 1 through 8 of FIG. 3).
4. Determine the region constants and induction variables occurring in the single entry strongly connected region (hereinafter called the region). Region constants include all variables which are operands in the region but for which the Def function has no definitions with the region (FIG. 3).

All variables which are defined in the region are potential induction variables. Eliminate from the set of region induction variables all variables which are computed by operations other than addition, subtraction, or copying (essentially addition of zero). Remove any variables which are computed from operands which are not region constants or potential induction variables.

5. Identify all essential computations in the region (FIG. 3).
6. Rewrite the essential computations as a sum of products (FIG. 3). For each operand in the essential computation, replace it with its computational definition if all of the following conditions are met (block 4):
   a. There is only one instruction in the program which defines that operand.
   b. The unique definition of the operand lies in the region being processed (but not in region interior to the one being processes).
   c. The unique instruction that computes the operand is either an addition, subtraction, multiplication, or move register.
7. Repeat the previous step until no operands can be replaced by their definitions.

Figure 4:
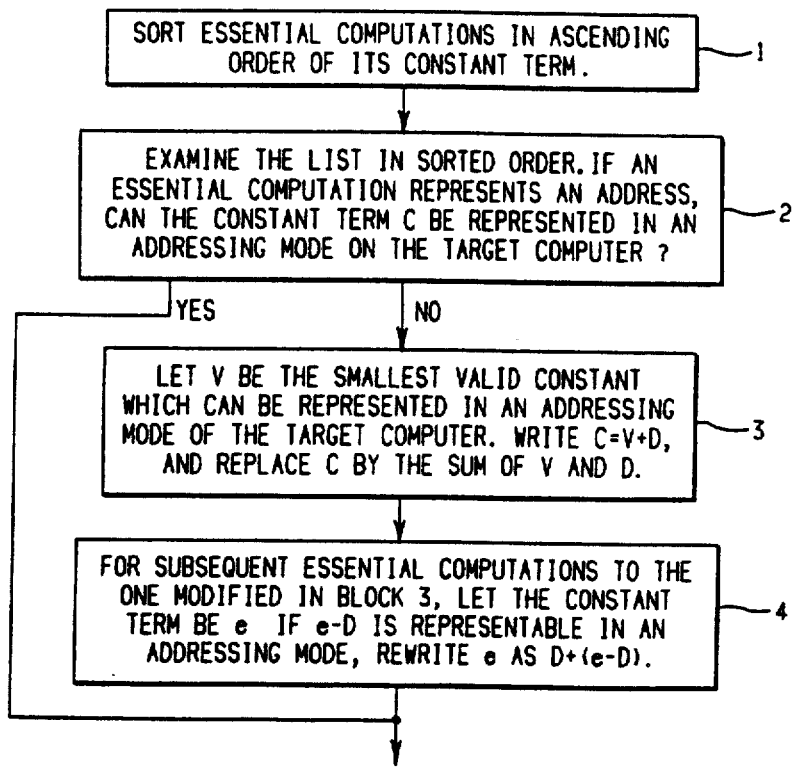
FIG. 4 comprises a flow chart illustrating the steps necessary to restructure an addressing computation into compliance with the addressing modes of the target computer.

FIG. 4, which is a detailed explanation of block 5 of FIG. 3, shows how constants appearing in the addressing computations are bought into conformance with the target computer's addressing modes.

In particular, it concerns itself with forcing constant terms appearing in an addressing computation to be within the range permissible by the target computer's addressing format.

8. Arrange all the essential computations in ascending order, sorting on the constant term (if any) in the essential computation. Beginning at the smallest constant term if the essential computation is used for addressing, determine whether that constant term (hereinafter called the displacement) can be used directly in an addressing mode of the target computer. If it is out of range (blocks 1 through 4 of FIG. 4):
   a. Replace the displacement by the sum of the smallest valid displacement for the target computer and the difference between the smallest valid displacement and the displacement in this instruction. The aforementioned difference will be called D.
   b. Examine the essential computations which follow the modified one in the ordered list. For such an essential computation with displacement d, if the difference d−D is itself a valid displacement for the target computer's addressing mechanism, rewrite the displacement as the sum of D and (d−D). Then recommence step 8 for successive essential computations starting with the first essential computation not processed in step b.

Figure 5:
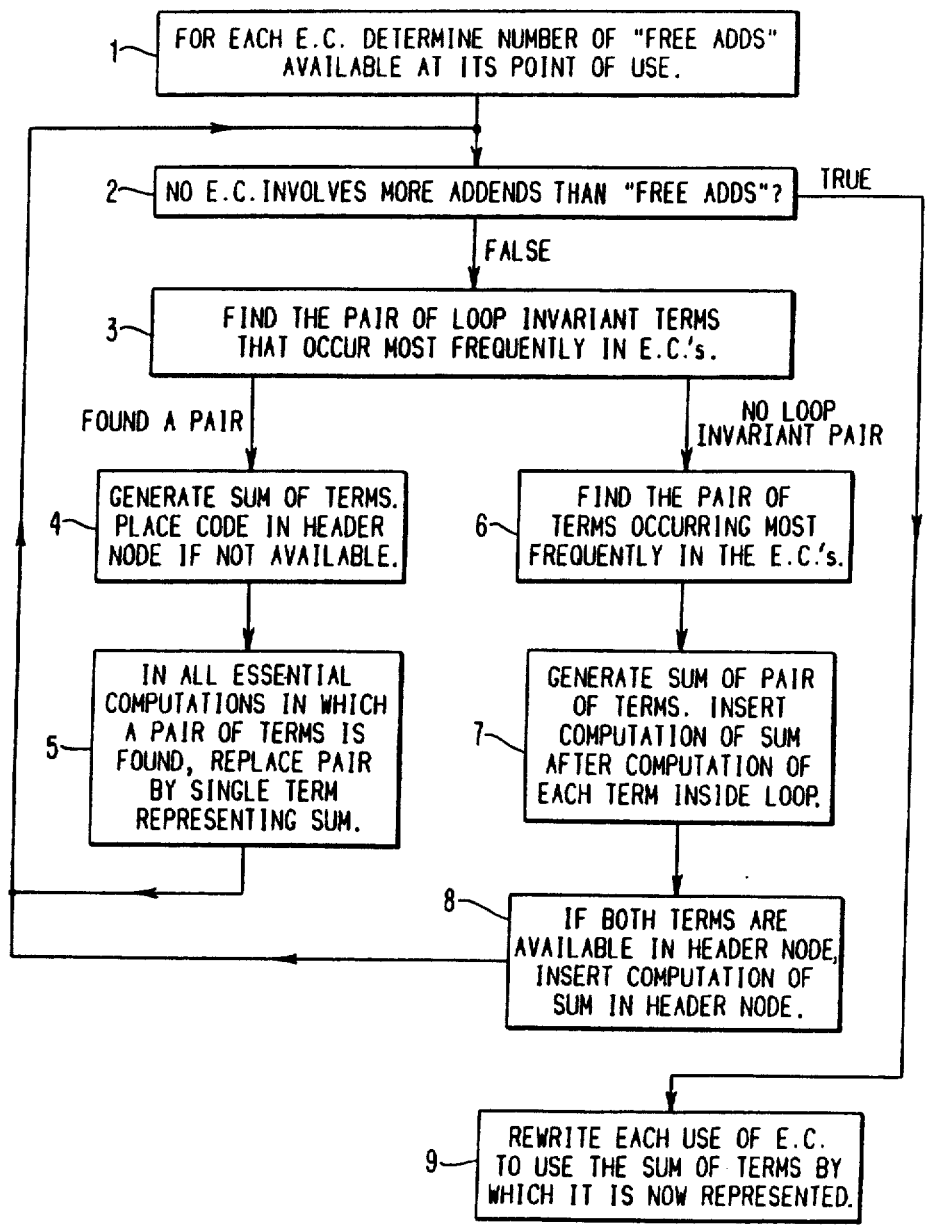
FIG. 5 comprises a detailed flow chart illustrating the heart of the Reassociation process.

The Reassociation procedure is diagrammed in FIG. 5. It comprises a detailed explanation of block 6 of FIG. 3 and brings every essential computation into conformance with the target computer's architecture, discovering and exploiting common subexpressions among the essential computations. It shows how preference is given to loop invariant sub-expressions among the essential computations, and how these are inserted to be computed in the loop header node.

9. Each essential computation, in final form, can be left as the sum of several terms, depending on where the essential computation is used. For example, an address of an object in main memory may be left as the sum of two or three terms, if one uses the addressing modes of System/370, provided that one of three terms be a displacement. Other essential computations may be required to be in a single register. In the case of the memory address, it may be observed that, as a consequence of the machine's addressing mode, several terms can be "added for free" when memory is being addressed. For each essential computation, indicate how many terms can be "added for free" (FIG. 5, block 1). If any essential computation consists of more terms than can be "added for free", (FIG. 5, block 2).

a. Examine all the essential computation which have too many terms for a pair of terms, both of which are loop invariant (FIG. 5, block 3). If such a pair is found, then,
  (1) generate the sum of the loop invariants and place it at the end of the header node (FIG. 5, block 4).
  (2) In all essential computations where the found pair of terms appears, replace the pair of terms by a single term consisting of the register that holds the sum of the pair of terms. The repeat Step 9. (FIG. 5, block 5).

b. Search the essential computations which have too many terms for that pair of terms which occurs most frequently, and (FIG. 5, blocks 3 and 6).
  (1) Generate the sum of the pair of terms. Insert the computation to generate the sum after the computation of each addend inside the loop. The location where the addends are computed can be found from the Def function (FIG. 5, block 7).
  (2) If every register in the standard representation of the sum has a definition which is known in the header node, then insert a computation of the sum in the header node (FIG. 5, block 8). In all essential computations where the chosen pair of terms occurs, replace the pair of terms by the register which holds the sum of the pair of terms. Then repeat Step 9 (blocks 2 through 8).

10. Now that each essential computation is written as a sum of terms, and the number of terms for each expression does not exceed the number of "free additions" that are available in the instruction that produces the essential result, rewrite that instruction using the registers developed in Step 9. The restructuring of the terms in an essential computation is the heart of the reassociation process (FIG. 5, block 9).

Figure 6:
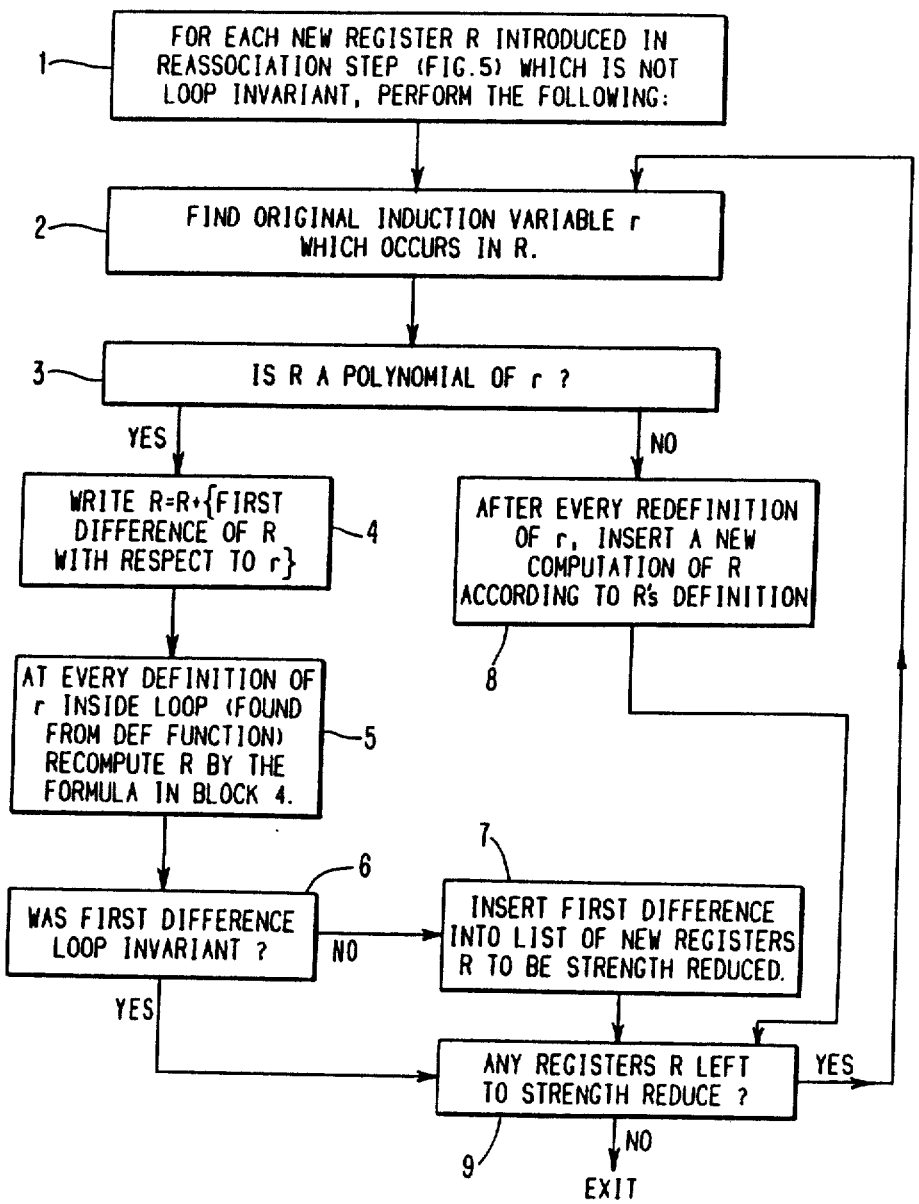
FIG. 6 comprises a detailed flow chart of the strength reduction procedure which is applied to all computations which are used by the Reassociation process.

The following step, 11, is explained in FIG. 6 which details the strength reduction step, which is applied in turn to all computations which are used by the reassociation process. The strength reduction enables all nth degree polynomials of induction variables to be computed with n additions and no multiplications inside the loop. In the common case of a linear expression, an addressing computation is kept current from iteration to iteration by a single addition.

11. For each new register R introduced in Step 9 or in Step 11 (FIG. 6, block 7) which is not a loop invariant, find the definition points within the loop for all registers r that are used in the computation of R. If R is linear in r, then a new value of R can be computed from its current values as:

$$R = R + (\text{first difference of } R \text{ with respect to } r).$$

In almost all cases, the first difference is a loop invariant, and can simply be computed in the loop header node. (In fact, the first difference is usually a constant) (FIG. 6, blocks 3–6). If the first difference is not a loop invariant, then it must be initialized in the loop preheader, and the register which holds the first difference must be recomputed at all the definition points of its variables within the loop (FIG. 6, block 7). If the first difference is not a polynomial, then the register R must be recomputed at the definition point of all registers r that occur in R without benefit of the use of its first difference (FIG. 6, block 8).

When it is possible to exploit the first difference to recompute R, we say that the expression for R has been reduced in strength.

Figure 7:
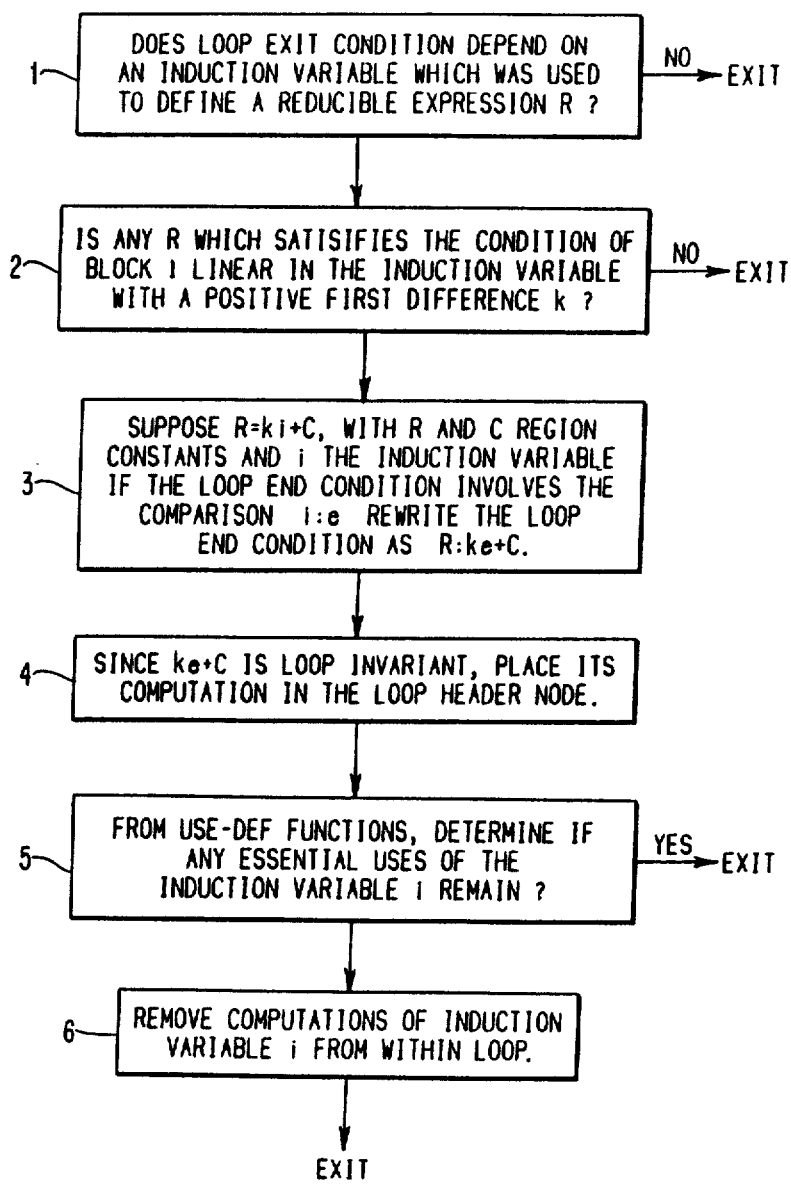
FIG. 7 comprises a detailed flow chart illustrating the interest test replacement procedure.

The details of step 12 are set forth clearly in FIG. 7. which describes the linear test replacement process, by which the loop terminating condition can often be rewritten in terms of a new induction variable introduced by reassociation. In this way, the transformed program may only require the new induction variables, and the original ones may become dead and their computations subject to dead code elimination.

12. If a loop exit condition is written in terms of an induction variable, and the induction variable is used to compute an input R of an essential computation, then the loop exit condition can be recoded in terms of R provided that it can be determined that the first difference of R with respect to the induction variable is a positive constant (FIG. 7, blocks 1 and 2). By rewriting the loop end condition in terms of a new register produced by reassociation, it may be that there are no essential uses left of the original induction variable (FIG. 7, blocks 3 and 4). This can be ascertained by following the def-use chains and observing whether the induction variable is an operand in any essential computation. (It will still be an operand to the instruction by which the induction variable is itself increased by a constant amount.) If no essential uses remain of an induction variable, it can be removed as dead from within that loop (see FIG. 7, blocks 5 and 6.).

13. Repeat all of steps 4 to 12, for each region in the program, starting with the innermost regions. If a region contains a previously processed region, the new computations inserted in the inner loop's header should also be considered as candidates for reassociation.

The following steps are performed in FIG. 2, block 4.

14. Eliminate dead computations. This removes original calculations of essential computations, if the original ones do not occur as subexpressions of any essential computations.

15. Eliminate dead induction variables (FIG. 7, blocks 5 and 6). This requires examining the use-def chains for each induction variable to determine that its only use is to update itself. (See the remarks in Step 12).

16. Perform global constant propagation. Code inserted into loop headers often involve computations with constants.

17. Perform global common subexpression elimination and code motion. The newly introduced methods of calculating essential computations were designed to create common subexpressions and new loop invariants.

This completes the detailed description of the present "Reassociation" procedure used in the "Code Optimization" phase of operation of a typical optimizing compiler. The following is an example showing in greatly simplified form how the disclosed invention would improve a short code segment.

EXAMPLE

Example 1 comprises a simple program that is amenable to improvement by reassociation.

The program consists of two nested loops, whose purpose is to transpose the elements of an array.

Listing 1 is an intermediate language listing of that program after box two of FIG. 2 has been completed. The optimizations of code motion and redundant expression elimination have already been completed.

Listing 2 is the intermediate language listing of that program after reassociation has been performed. The program ostensibly is degraded, but this is because old code has not been removed (it might be needed for other than address computation), and much of the inserted code can be simplified by constant propagation. Furthermore, the many MR (Move Register) instructions may disappear as a result of register allocation if the source and the target of the MR can be allocated to the same register.

The code between labels %4 and %10 has been added to initialize the new address computations used in the inner loop, as well as to compute the new comparand to determine when to terminate the inner loop. Notice that these computations themselves are linear in registers set in the outer loop. As a consequence, the very computations inserted between labels %4 and %10 are themselves subjected to reassociation, and the initialization of the resulting new computations appear between labels %3 and %11. The effects will be to make most of the originally inserted instructions between labels %4 and %10 dead. Furthermore, many of the instructions that were inserted can be executed at compile time (constant propagation).

Listing 3 represents the code after performing constant propagation and value numbering. A large number of move register instructions (MR in the figure) remain. Many of these variables have become useless induction variables whose results are never used. In other cases, register allocation will be able to assign the source and target of the MR to the same physical register, so that the MR need not generate any code.

Listing 4 represents the final code after performing dead code elimination, dead induction variable elimination, and register allocation. Except for the transformation of the code from Listings 1 and 2, the other transformations are standard optimization transformations found in working compilers. The reassociation procedure, as taught herein, does not concern itself directly with removing the excess code inserted in the transition from Listing 1 to Listing 2. Instead, the methods of reassociation are simple, and general. It depends on being used in the environment of an optimizing compiler to remove the excess code, and leave the superior address generation, together with whatever original code still has use.

EXAMPLE 1: A simple program to Demonstrate Reassociation

```
example: proc;
  dcl
    a(75, 75) integer static,
    b(75, 75) integer static,
    (i, j) integer,
    ;
  do i=1 to 75;
    do j=1 to 75;
      b(i, j)=a(j, i);
    end;
  end;
end;
```

Listing 1: Intermediate Language Code
for the Program of Example 1 Prior to Reassociation

| | |
|---|---|
| PDEF | EXAMPLE |
| ST | r167,/.STATIC(r14) |
| MR | *r149,r167 |
| LI | r130,1 |
| ST | r130,I(r14) |
| MR | *r133,r130 |
| CI | r135,r133,75 |
| MR | *r139,r135 |
| %3: | |
| ST | r130,J(r14) |
| MR | *r144,r130 |
| CI | r146,r144,75 |
| MR | *r147,r146 |
| SI | r154,r133,1 |
| M23I | r157,r154,300 |
| M23I | r159,r154,4 |
| %4: | |
| SI | r150,r144,1 |
| M23I | r153,r150,4 |
| A | r158,r153,r157 |
| M23I | r161,r150,300 |
| A | r162,r159,r161 |
| A | r163,r149,r162 |
| L | r164,A(r163) |
| A | r165,r149,r158 |
| ST | r164,B(r165) |
| MR | *r172,r164 |
| CI | r146,r144,75 |
| MR | *r147,r146 |
| AI | r145,r144,1 |
| ST | r145,J(r14) |
| MR | *r144,r145 |
| BT | r147,b25/1t,%4 |
| CI | r135,r133,75 |
| MR | *r139,r135 |
| AI | r134,r133,1 |
| ST | r134,I(r14) |
| MR | *r133,r134 |
| BT | r139,b25/1t,%3 |
| RET | EXAMPLE,0 |
| PEND | EXAMPLE |

Listing 2: Intermediate Code for
the Program of Example 1 Immediately After Reassociation

| | |
|---|---|
| PDEF | EXAMPLE |
| MR | *r149,r167 |
| LI | r130,1 |
| MR | *r133,r130 |
| %3: | |
| SI | *r208,r133,75 |
| M23I | *r209,r133,300 |
| M23I | *r210,r130,300 |
| M23I | *r211,r133,4 |
| M23I | *r212,r130,4 |
| A | *r213,r149,r209 |
| A | r214,r149,r210 |
| A | *r215,r211,r214 |
| A | r216,r212,r213 |
| A | r217,r149,r212 |
| A | *r218,r209,r217 |
| SI | r219,r215,4 |
| SI | r220,r211,4 |
| A | *r221,r214,r220 |
| SI | r222,r218,300 |
| SI | r223,r212,300 |
| A | r224,r149,r223 |
| A | *r225,r209,r224 |
| AI | r134,r133,1 |
| M23I | r226,r134,300 |
| A | *r227,r149,r226 |
| M23I | r229,r134,4 |
| SI | r230,r229,4 |
| A | *r231,r214,r230 |

-continued

| | |
|---|---|
| A | *r233,r224,r226 |
| AI | *r243,r149,22500 |
| %11: | |
| MR | *r144,r130 |
| SI | r154,r133,1 |
| M23I | r157,r154,300 |
| M23I | r159,r154,4 |
| %4: | |
| SI | *r186,r144,75 |
| M23I | *r187,r144,4 |
| M23I | *r188,r144,300 |
| A | *r189,r149,r187 |
| A | r190,r149,r159 |
| A | r191,r157,r189 |
| A | r192,r149,r157 |
| MR | *r193,r225 |
| MR | *r194,r221 |
| AI | r145,r144,1 |
| M23I | r195,r145,4 |
| A | *r196,r192,r195 |
| M23I | r198,r145,300 |
| A | *r199,r190,r198 |
| AI | r205,r157,300 |
| MR | *r206,r213 |
| %10: | |
| SI | r150,r144,1 |
| M23I | r153,r150,4 |
| A | r158,r153,r157 |
| M23I | r161,r150,300 |
| A | r162,r159,r161 |
| A | r163,r149,r162 |
| L | *r164,A-300(r194) |
| A | r165,r149,r158 |
| ST | r164,B-4(r193) |
| C | *r146,r193,r206 |
| MR | *r147,r146 |
| AI | *r196,r193,4 |
| AI | *r199,r194,300 |
| AI | r145,r144,1 |
| MR | *r193,r196 |
| MR | *r194,r199 |
| MR | *r144,r145 |
| BT | r147,b25/1t,%10 |
| C | *r135,r213,r243 |
| MR | *r139,r135 |
| AI | *r277,r213,300 |
| AI | *r231,r221,4 |
| AI | *r233,r225,300 |
| AI | r134,r133,1 |
| MR | *r213,r227 |
| MR | *r221,r231 |
| MR | *r225,r233 |
| MR | *r133,r134 |
| BT | r139,b25/1t,%11 |
| RET | EXAMPLE,0 |
| PEND | EXAMPLE |

Listing 3: Intermediate Language Code after Reassociation, Constant Propagation, and Value Numbering

| | |
|---|---|
| PDEF | EXAMPLE |
| MR | *r167,r1 |
| MR | *r149,r167 |
| LI | r130,1 |
| MR | *r133,r130 |
| LI | *r222,4 |
| LI | *r219,5 |
| LI | *r217,80 |
| LI | *r216,75 |
| LI | *r215,300 |
| MR | *r209,r215 |
| MR | *r191,r222 |
| MR | *r189,r219 |
| MR | *r186,r217 |
| MR | *r185,r216 |
| MR | *r184,r209 |
| MR | *r210,r184 |
| MR | *r211,r222 |
| MR | *r212,r191 |
| AI | *r213,r149,300 |
| MR | *r214,r213 |

-continued

| | |
|---|---|
| LI | *r220,0 |
| MR | *r221,r214 |
| LI | *r223,−296 |
| SI | *r224,r149,296 |
| AI | *r225,r224,300 |
| AI | *r243,r149,22500 |
| %3: | |
| MR | *r144,r130 |
| MR | *r193,r225 |
| MR | *r194,r221 |
| MR | *r206,r213 |
| %4: | |
| L | *r164,A-300(r194) |
| ST | r164,B-4(r193) |
| C | *r146,r193,r206 |
| MR | *r147,r146 |
| AI | *r196,r193,4 |
| AI | *r199,r194,300 |
| MR | *r193,r196 |
| MR | *r194,r199 |
| BT | r147,b25/1t,%4 |
| C | *r135,r213,r243 |
| MR | *r139,r135 |
| AI | *r227,r213,300 |
| AI | *r231,r221,4 |
| AI | *r233,r225,300 |
| MR | *r213,r227 |
| MR | *r221,r231 |
| MR | *r225,r233 |
| BT | r139,b25/1t,%3 |
| RET | EXAMPLE,0 |

Listing 4. Final Code for Program of Example 1, after all Optimizations and Register Allocation for an IBM RTPC Computing System

| | | | |
|---|---|---|---|
| 1\| | 000000 | | PDEF EXAMPLE |
| | 000000 ST | DDFE 003C | ST r15,r14,60 |
| 0\| | 000004 CAL | C8F1 012C | AI r15,r1,300 |
| 0\| | 000008 CAS | 65F0 | MR r5,r15 |
| 0\| | 00000A AI | C141 FED8 | SI r4,r1,296 |
| 0\| | 00000E CAL | C844 012C | AI r4,r4,300 |
| 0\| | 000012 CAL | C821 57E4 | AI r2,r1,22500 |
| 8\| | 000016 | | %3: |
| 0\| | 000016 CAS | 6340 | MR r3,r4 |
| 0\| | 000018 CAS | 6150 | MR r1,r5 |
| 9\| | 00001A | | %4: |
| 9\| | 00001A L | CD01 FEE4 | L r0,A-300(r1) |
| 8\| | 00001E C | B43F | C cr,r3,r15 |
| 8\| | 000020 INC | 9134 | INC r3,r3,4 |
| 8\| | 000022 CAL | C811 012C | AI r1,r1,300 |
| 8\| | 000026 BBX | 8F9F FFFA | BTX cr,b25/1t,%4 |
| 9\| | 00002A ST | DD03 57EC | ST r0,B-8(r3) |
| 7\| | 00002E C | B4F2 | C cr,r15,r2 |
| 7\| | 000030 CAL | C8FF 012C | AI r15,r15,300 |
| 7\| | 000034 INC | 9154 | INC r5,r5,4 |
| 7\| | 000036 BBX | 8F9F FFFO | BTX cr,b25/1t,%3 |
| 7\| | 00003A CAL | C844 012C | AI r4,r4,300 |
| 13\| | 00003E L | CDFE 003C | L r15,r14,60 |
| 13\| | 000042 BNBR | E88F | BFR 24,r15 |
| 13\| | 000044 00000000 00000000 | | PEND EXAMPLE |
| | FF000044 FFFFFFBB | | |
| | 01000006 8F2007 | | |
| | EXAMPLE | | |
| \| | 000062 | End of code CSECT | |

Having thus described our invention, what we claim as new, and desire to secure by Letters Patent is:

1. In an optimizing compiler, a method for use in a code optimization phase of the compiler's operation to optimize code in a program presented for compilation, said method utilizing reassociation principles to determine a preferred order of combining terms in a sum in order to produce loop invariant subcomputations and to promote common sub-expressions among several essential computations which method comprises the steps of:

1. performing control flow analysis on said code to find and indentify strongly connected regions in said program;
2. identifying and marking USE and DEF functions in said code;
3. locating and marking region constants and induction variables in said code;
4. locating and marking all essential computations in said code;
5. accessing and rewriting every essential computation as a sum of products where necessary;
6. utilizing the previously identified and marked USE and DEF functions to substitute for each operand R in an essential computation, its definition, if there is a unique computation of R in the strongly connected region comprising an addition, subtraction, multiplication or copying operation;
7. altering address displacements to comply with addressing mode constraints;
8. determining from the current form of each essential computation an optimum method for computing same and rewriting code to use this preferred method of computation;
9. replacing old code with newly generated code to update new induction variables;
10. performing linear test replacement, and
11. finally performing dead code elimination and, global constant propagation operations.

2. An optimization method for use in an optimizing compiler as set forth in claim 1, and wherein the step of altering address displacements to comply with addressing mode constraints includes the steps of:
1. sorting essential computations into a list of their constant terms in ascending order;
2. examining the list in sorted order and if an essential computation represents an address, determining if the constant term C can be represented in an addressing mode on a target computer, and if so proceeding to the determining step of claim 3, and if not;
3. letting V be the smallest valid constant which can be represented in an addressing mode of the target computer and representing C as (V+D) and replacing C by the sum of V and D, and
4. subsequently examining essential computations modified in step 3 above, and representing each constant term with a value e and, determining if e−D is representable in an addressing mode, and if so rewriting e as d+(e−D).

3. An optimization method for use in an optimizing compiler as set forth in claim 2, and wherein the step of "determining how to compute each essential computation" and rewriting code to use this preferred method of computation includes the following sequence of steps:
1. for each essential computation determining how many "free adds" are available at its point of use;
2. determining if an essential computation involves more addends than "free adds", and, if so proceeding to the next step and if not proceeding directly to step 9;
3. finding the pair of loop invariant terms that occur most frequently in the essential computation, if a pair is found proceeding to step 4 and if not, proceeding to step 6;
4. generating a sum of terms and placing the code in a header node of a code sequence if the sum of terms is not available;
5. replacing the pair by a single term representing the sum in all essential computations in which the pair of terms is found, and returning to step 2;
6. finding the pair of terms occurring most frequently in the essential computation;
7. generating the sum of the pair of terms, and inserting the generated sum after each computation of the pair of terms inside a loop being optimized;
8. determining if both terms are available in the header node and if so, inserting the computation of the sum in the header node, and
9. rewriting each use of an essential computation to use the sum of terms by which it is now represented.

4. An optimization method for use in an optimizing compiler as set forth in claim 3 and wherein the step of "inserting code to update new induction variables" comprises, for each new operand R introduced in the reassociation method which is not loop invariant, performing the following sequence of steps:
1. finding an original induction variable r which occurs in operand R;
2. determining if R is a polynomial of r, and if so, proceeding to the next step, and if not proceeding to step 7;
3. redefining R as equal to R+(the first difference of R with respect to r);
4. at every definition of r, found from the DEF function, inside the loop, recomputing R by the definition specified in the previous step;
5. determining if the first difference found above is loop invariant and if so, proceeding to step 8 of the present sequence and if not, continuing to step 6;
6. inserting the first difference into the list of new registers R to be strength reduced, and proceeding to step 8;
7. after every redefinition of r, inserting a new computation of R according to R's definition, and proceeding to step 8;
8. determining if there are any registers R left to be strength reduced, and if so returning to step 1 of the present sequence and if not proceeding to the step of performing linear test replacement.

5. An optimization method for use in an optimizing compiler as set forth in claim 4, and wherein the step of performing linear test replacement comprises the following sequence of steps:
1. determining if a loop exit condition depends on an induction variable which was used to define a reducible expression R, if not, exiting from the sequence, if so, proceeding to step 2;
2. determining if there is any R which satisfies the loop exit condition determined in step 1 which is linear in the first induction variable with a positive first difference K;
3. in the equality $R=ki+C$, wherein R and C are region constants and i is the induction variable, determining if the loop end conditions involve the comparison $i=e$ and if so, rewriting the loop end condition as $R=ke+C$;
4. Since $ke+C$ is loop invariant, placing its computation in a header node for the loop;
5. determining from the USE and DEF functions if any essential uses of the induction variable i remain, if so, proceeding to the step of performing dead code elimination and global constant propagation operations, and if not;
6. removing computations of the induction variable i from within the loop and proceeding to the step of performing dead code elimination and global constant propagation operations.

* * * * *